(12) United States Patent
Yanagisawa et al.

(10) Patent No.: US 6,313,915 B1
(45) Date of Patent: Nov. 6, 2001

(54) DISPLACEMENT MEASURING METHOD AND APPARATUS

(75) Inventors: Kuniaki Yanagisawa, Shiga-ken; Yoshinori Ikeda, Otsu; Shintaro Koike; Ryo Nishiki, both of Omihachiman, all of (JP)

(73) Assignee: Murata Manufacturing Co., Ltd., Nagaokakyo (JP)

(*) Notice: Subject to any disclaimer, the term of this patent is extended or adjusted under 35 U.S.C. 154(b) by 0 days.

(21) Appl. No.: 09/383,236

(22) Filed: Aug. 26, 1999

(30) Foreign Application Priority Data

Aug. 27, 1998 (JP) .................................. 10-242074
Aug. 27, 1998 (JP) .................................. 10-242086

(51) Int. Cl.$^7$ .................................................. G01B 11/14
(52) U.S. Cl. ........................................... 356/375; 356/373
(58) Field of Search .............................. 356/373, 375, 356/376; 250/201.6, 201.2

(56) References Cited

U.S. PATENT DOCUMENTS

| | | | |
|---|---|---|---|
| 4,209,252 | * | 6/1980 | Arditty et al. ..................... 356/124 |
| 4,806,778 | * | 2/1989 | Yamamoto et al. ................. 356/373 |
| 4,850,695 | * | 7/1989 | Mikuriya et al. ................... 356/237 |
| 5,033,856 | * | 7/1991 | Nose et al. .......................... 356/376 |
| 5,394,100 | * | 2/1995 | Bohler et al. ....................... 324/758 |
| 5,448,359 | * | 9/1995 | Schick et al. ....................... 356/375 |

FOREIGN PATENT DOCUMENTS

| | | | |
|---|---|---|---|
| 0083612 | * | 4/1987 | (JP) ..................................... 356/373 |
| 404366711 | * | 12/1992 | (JP) ..................................... 356/373 |
| 406003126 | * | 1/1994 | (JP) ..................................... 356/373 |

* cited by examiner

*Primary Examiner*—Hoa Q. Pham

(57) ABSTRACT

A displacement measuring method and apparatus can measure positions and displacements of measurement objects with high precision without regard to surface roughness. Optical beams emitted from a light source are converged through an objective lens, are incident on a surface of the measurement object, are reflected off the surface of the measurement object, and are received by an optical detector. In measurement of the surface of the measurement object, optical-intensity curves are defined while the objective lens is being shifted in the optical-axis direction. According to optical-intensity curves thus defined, a threshold $P_{th}$ is defined, a center of gravity of a graph region surrounded by the optical-intensity curve is defined, and the focal point of the objective lens, when positioned at the center of gravity, is determined to be the position of a surface of the measurement object.

12 Claims, 12 Drawing Sheets

Fig. 20

OPTICAL INTENSITY P

CENTER OF GRAVITY

B $Z_G$

POSITION OF OBJECTIVE LENS Z

Fig. 21

OPTICAL INTENSITY P

CENTER OF GRAVITY $P_{th} = P_G$

B $Z_3$ $Z_4$

POSITION OF OBJECTIVE LENS Z

DISPLACEMENT MEASURING METHOD AND APPARATUS

The instant application claims priority under 35 U.S.C. § 119 based on Japanese Patent Application documents Nos. 10-242086 and 10-242074, both filed on Aug. 27, 1998, and both of which are incorporated herein in their entireties by reference.

BACKGROUND OF THE INVENTION

1. Field of the Invention

The present invention relates to a displacement measuring method and apparatus, particularly, to a displacement measuring method for performing non-contact measurement of surface positions and surface displacements of measurement objects.

2. Description of the Related Art

FIG. 1 shows a configuration of a conventional displacement measuring apparatus 1. The displacement measuring apparatus 1 uses a confocal optical system in which optical beams emitted from a light source 2, such as a laser diode, are passed through a collimating lens 3, are converted to parallel optical beams, and are passed through a beam-splitter cube 4. After passing through the beam-splitter cube 4, the optical beams are converged by an objective lens 5, and the converged optical beams are incident on a surface of a measurement object 6. The optical beams, having been reflected off the surface of the measurement object 6, are passed through the objective lens 5 again, are incident on the beam-splitter cube 4, and are reflected by 90 degrees therethrough. The optical beams having been reflected by 90 degrees through the beam-well-balanced stable optical-intensity curve, as shown in FIG. 2. This allows the position to be measured with high precision.

When the surface of the measurement object 6 has irregularities, however, optical-intensity curves shown in FIGS. 3 and 4 are produced. Determination of the point $z_0$ which is equivalent to the optical-intensity maximum (the position of the objective lens 5 at the optical intensity maximum value) is difficult, preventing the position and variations to be measured with high precision.

Also, with a method that detects the position of a surface of a measurement object according to the maximum value of an optical-intensity curve, when a high optical intensity is suddenly detected because of noise and the like (as shown in FIG. 10), erroneous measurement results are produced. This causes measurement operation to be inconsistent.

Referring back to the above, the lens surface is a surface whose roughness Ra is at most 0.01 μm. A surface having irregularities means a surface whose roughness ranges from 0.1 μm to 1 μm.

SUMMARY OF THE INVENTION

In view of the problems described above, an object of the present invention is to provide a displacement measuring splitter cube 4 are converged through a converging lens 7. The converged optical beams are passed through a pinhole arranged at the focal point of the converging lens 7, and only optical beams passing through the pinhole 8 are incident on an optical detector 9 so as to be measured.

In the displacement measuring apparatus 1, the objective lens 5 can be shifted and adjusted in the optical-axis direction (vertical direction in FIG. 1). While shifting the objective lens 5 in the optical-intensity axis direction, the optical intensity to be measured by the optical detector 9 varies according to the position of the objective lens 5. In this, when the distance between a surface of the measurement object 6 (optical-beam-target position) is equal to the effective focal length of the objective lens 5, an optical intensity P of the optical detector 9 becomes a maximum value $P_{max}$. Therefore, when a position $z_0$ of the objective lens 5 at which the optical intensity is maximum is defined according to the variations (optical-intensity curve), the position of the surface of the measurement object 6a can be detected by detecting a distance from position $z_0$ to the focal point of the objective lens 5.

In the displacement measuring apparatus 1 as described above, when the surface of the measurement object 6 is close to the lens surface, the optical intensity P when the position of the objective lens 5 varies is represented by a method and a displacement measuring apparatus that can measure positions and displacements of measurement objects regardless of the condition of surfaces of the measurement objects.

To these ends, according to one aspect of the present invention, a displacement measuring method projects optical beams to a measurement object through an objective lens, receives optical beams reflected off the measurement object, and shifts the focal point of the objective lens in the optical-axis direction, thereby measuring variations in the optical intensity which are attributable to shifting of the focal point. A threshold is defined according to a curve representing the variations in the optical intensity and the center of gravity in a graph region surrounded by the curve and the threshold is defined, thereby measuring displacements of the measurement object according to the center-of-gravity position.

According to the above aspect of the present invention, a threshold is defined according to a curve representing variations in the optical intensity, the center of gravity in a graph region surrounded by the curve and the threshold is defined, and displacements of the measurement object are measured according to the center-of-gravity position. Therefore, positions and displacements of the measurement object can be measured with a precision range smaller than a sampling interval in the shift direction of the objective lens, and the measurement precision can be improved to be higher than conventional cases. Furthermore, the present invention defines a threshold and uses optical intensity data which is equal to or higher than the defined threshold. Therefore, noise components, which adversely affect measurement, can be eliminated, thereby improving the precision of measurements.

Also, the displacement measuring apparatus detects the position of a surface of the measurement object according to the center-of-gravity position of the optical-intensity curve. Therefore, even when unusually large values are detected because of factors such as noise, measurement is not affected thereby, and relatively stable measurement results can be produced.

According to another aspect of the present invention, a displacement measuring method projects optical beams to a measurement object through an objective lens, receives optical beams reflected off the measurement object, shifts the focal point of the objective lens in the optical-axis direction, thereby measuring variations in the optical intensity which are attributable to shifting of the focal point. A predetermined curve approximated from a curve representing the variations in the optical intensity and measuring displacements of the measurement object according to the approximate curve is defined. This allows the detection of displacements of the measurement object according to, for example, the center line, the center of gravity, or the maximum value of the approximate curve.

Also, the present invention may define a predetermined approximate curve according to a curve representing displacements of combined optical intensities, and displacements of the surface of the measurement object are measured according to the approximate curve. With this arrangement, the present invention can determine the focal point of the objective lens according to a substantially ideal curve to detect displacements of the measurement object.

Furthermore, according to another aspect of the present invention, a displacement measuring method projects optical beams to a measurement object through an objective lens, receives optical beams reflected off the measurement object, shifts the focal point of the objective lens in the optical-axis direction, thereby measuring variations in the optical intensity which are attributable to shifting of the focal point. Variations in the individual optical intensities measured at a plurality of measurement positions are combined and measuring displacements of the measurement object according to the combination result are measured.

The above method may be implemented by means of, for example, the following displacement measuring apparatus. The apparatus has a light emitter for emitting optical beams, an objective lens for projecting optical beams emitted from the light emitter to a measurement object, a lens driver for shifting the objective lens in the optical-axis direction, a lens-position detector for detecting the position of the objective lens, an optical receiver for receiving optical beams reflected off the measurement object, a shifting mechanism for shifting the position to which optical beams are projected along a surface of the measurement object, and a measuring unit for combining variations in optical intensities which are measured by the optical receiver at a plurality of measurement positions of the measurement object while the objective lens is moved and for measuring displacements of the measurement object according to the combination result The displacement measuring method detects displacements of the measurement object according to a result of combining optical intensities measured at a plurality of measuring positions. In this case, the relative magnitude of an optical intensity which is relatively high and has a small error range can be increased while the relative magnitude of an optical intensity which is relatively low and has a wide error range can be reduced. This allows a reduction of diverging effects due to irregularities of the surface of the measurement object. Therefore, according to the present invention, positions and displacements of the surface of the measurement object can be measured stably and with high precision.

Displacements of the measurement object from a result of combining optical intensities at a plurality of measurement positions can be detected from a position where variations of the combined optical intensity reaches the maximum. This simplifies the operation for detecting of the displacements of the measurement object.

Also, the present invention may define a threshold according to the curve representing variations in the combined optical intensity, define a center-of-gravity position of a graph region surrounded by the curve and the threshold, and measure displacements according to the center-of-gravity position. Also, the present invention may define a threshold and use optical intensity data which is equal to or higher than the defined threshold. Therefore, noise components can be eliminated, and therefore, measurement precision can be further improved.

In addition, the present invention may define a predetermined curve approximated from a curve representing variations of the combined optical intensity and measure displacements of the measurement object according to the approximate curve. With this arrangement, a focal point of a substantially ideal curve can be determined, and thereby, measurement of displacements of the measurement object can be implemented.

Furthermore, the present invention may detect the position of the surface of the measurement object according to the center-of-gravity position and the approximate curve of the optical-intensity curve. With this arrangement, even when unusually large values are detected because of noise and other unexpected incidents, the measurement is not affected, and therefore, relatively stable measurement results can be produced.

BRIEF DESCRIPTION OF THE DRAWINGS

FIG. 20 is a view for explaining a method for detecting the position of a surface of a measurement object in another embodiment of the present invention;

FIG. 21 is a view for explaining a way of determining an optical-intensity threshold in another embodiment of the present invention;

DESCRIPTION OF THE PREFERRED EMBODIMENTS (First Embodiment)

Figure 5:
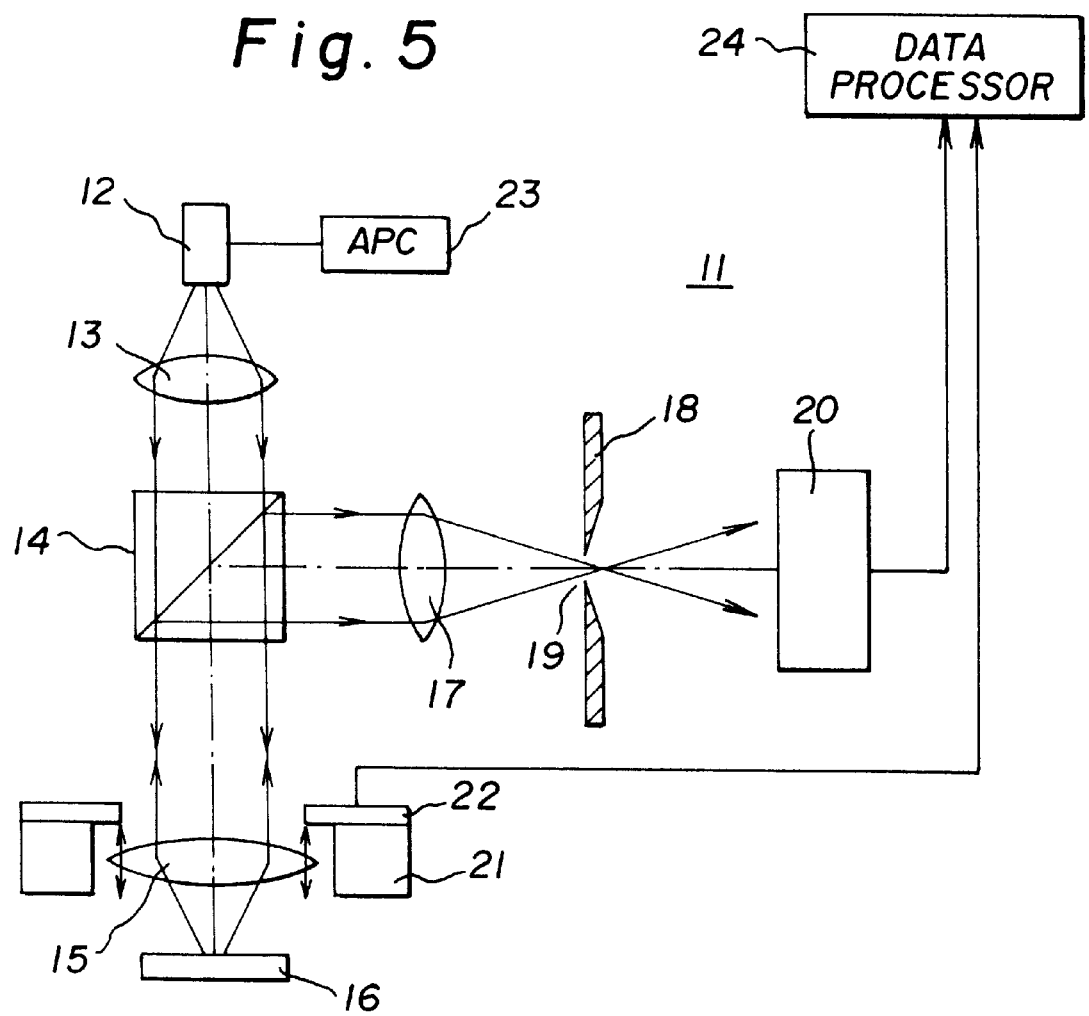
FIG. 5 is a schematic view showing a configuration of an embodiment of a displacement measuring apparatus according to the present invention.

FIG. 5 is a schematic view of a configuration a displacement measuring apparatus 11 according to a first embodiment of the present invention. A light source 12 is comprised of elements such as a laser diode and a laser-driving circuit, and it outputs optical beams (laser beams) controlled by an automatic power controller (APC) 23 so as to have a predetermined optical intensity. The light source 12 is arranged so that its illuminant point is aligned with the focal point of a collimating lens 13, and diverging optical beams emitting from the light source 12 are converted to parallel optical beams. After passing through the collimating lens 13 and having been converted to the parallel optical beams, the optical beams are then incident on a beam-splitter cube 14, and a part of the optical beams is passed through the beam-splitter cube 14 and are incident on an objective lens 15.

The objective lens 15 has a lens driver 21, and is driven by the lens driver 21 at a predetermined amplitude and a predetermined frequency. Drivers that can be employed for the lens driver 21 include a type in which a magnetic force is exerted on a magnetic material provided in the objective lens 15 by using an alternating magnetic field occurring in a voice coil so as to vibrate the objective lens 15 in the optical-axis direction at an amplitude of 100 μm and a frequency of 1 kHz. Near the objective lens 15 is provided a position sensor 22 that can detect the position of the objective lens 15 with high precision.

After passing through the objective lens 15, the optical beams are converged through the objective lens 15 and are then incident on a measurement object 16 placed so as to oppose the objective lens 15. The optical beams reflected off the measurement object 16 are passed through the objective lens 15 again, and a part of the optical beams is reflected by the beam-splitter cube 14. The optical beams reflected by the beam-splitter cube 14 are reflected by 90 degrees and are incident on a converging lens 17. A light shield 18 having a pinhole 19 is provided at the focal point of the converging lens 17, and the optical beams, after passing through the converging lens 17, are converged through the pinhole 19. The optical beams, which have passed through the pinhole 19, are then received by an optical detector 20 made of elements such as photodiode, a phototransistor, a CCD (charge-coupled device), and so on.

Figure 1:
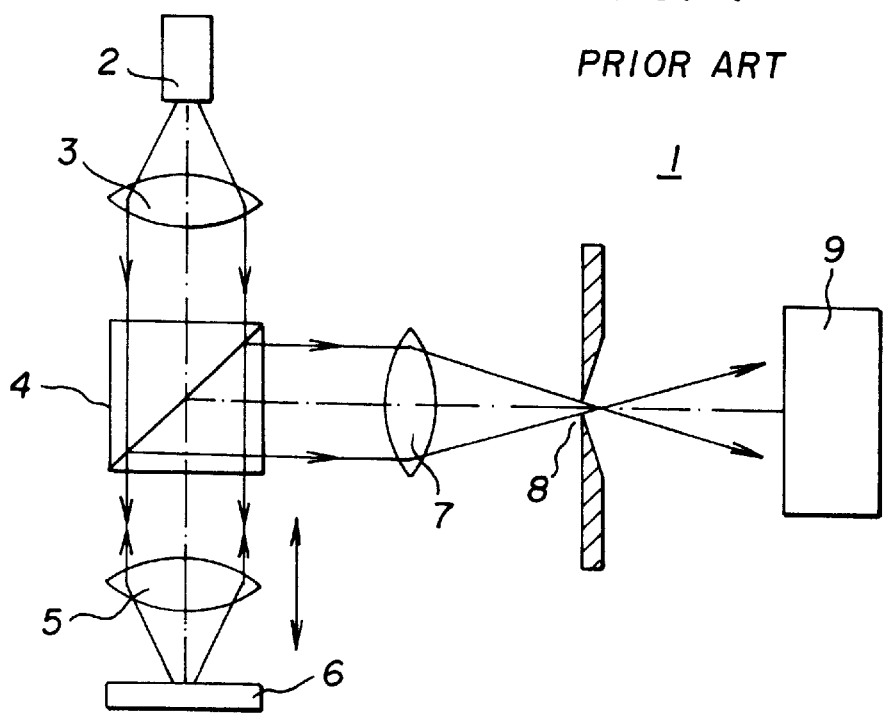
FIG. 1 is a schematic view showing a configuration of a conventional displacement measuring apparatus.
Figure 2:
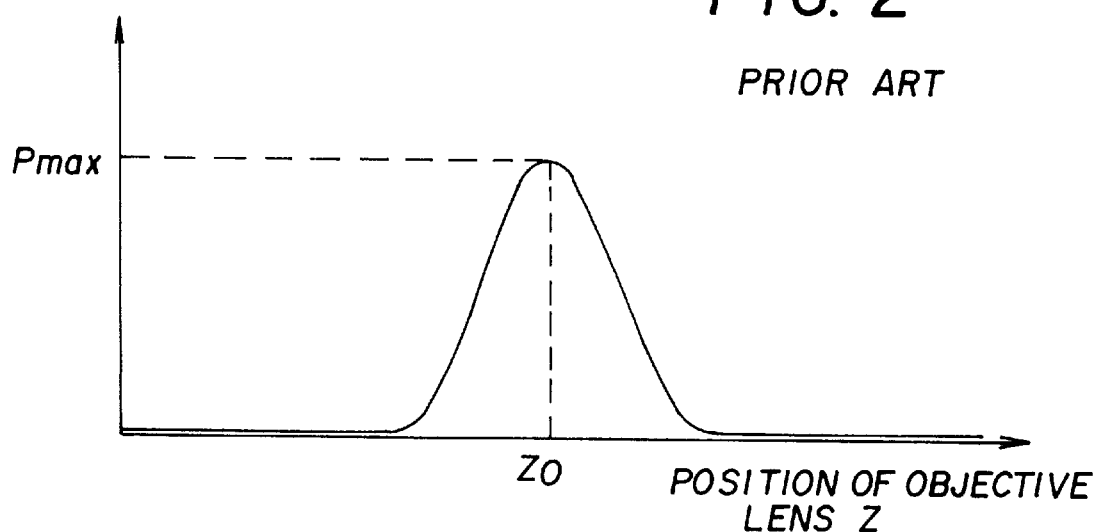
FIG. 2 is a graph showing an ideal optical-intensity curve measured by the conventional displacement measuring apparatus.
Figure 3:
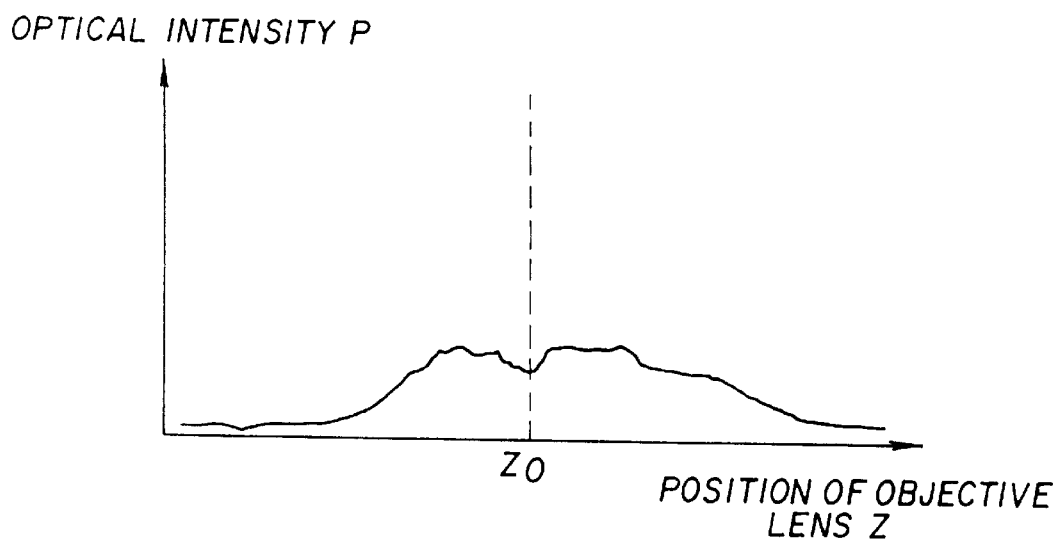
FIG. 3 is a graph showing an optical-intensity curve defined according to a measurement object having a surface with irregularities.
Figure 4:
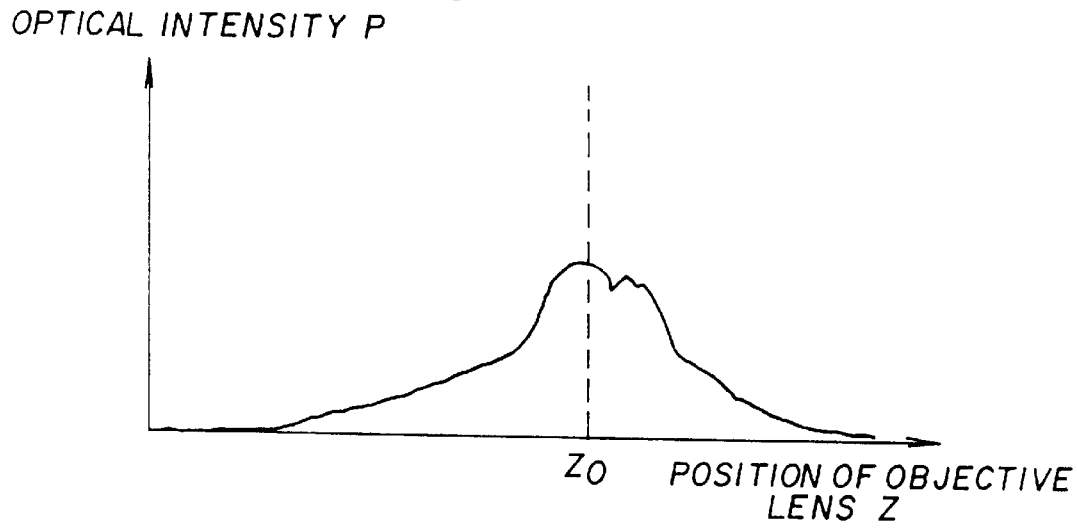
FIG. 4 is another graph showing an optical-intensity curve defined according to a measurement object having a surface with irregularities.

A data processor 24 receives information on the position of the objective lens 15, which has been detected by the position sensor 22, and a value P representing the optical intensity which has been measured by the optical detector 20. In this way, the data processor 24 retrieves the position-related information and the value P of the optical intensity, from the position sensor 22 and the optical detector 20 and performs predetermined processing so as to measure, for example, a curve representing the optical intensity, as shown in FIG. 2.

Figure 6:
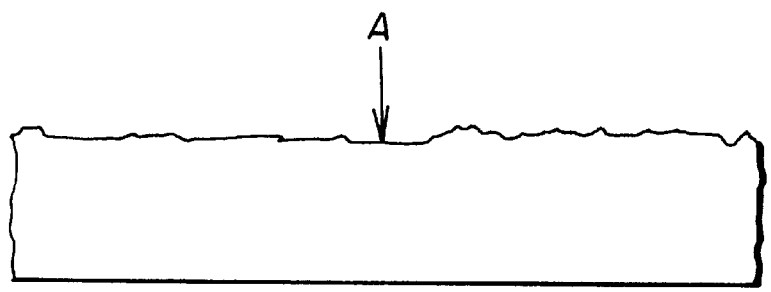
FIG. 6 is an enlarged view of a surface of a measurement object.

The displacement measuring apparatus 11 emits optical beams onto a surface of the measurement object, the surface having fine irregularities, as shown in FIG. 6, shifts the objective lens 15 in the optical-axis direction, measures variations in the optical intensity, defines an optical-intensity curve B, and stores the defined curve. With the defined optical-intensity curve B, which is assumed to be as shown in FIG. 7, the data processor 24 defines a threshold $P_{th}$ according to the optical-intensity curve B.

Figure 8:
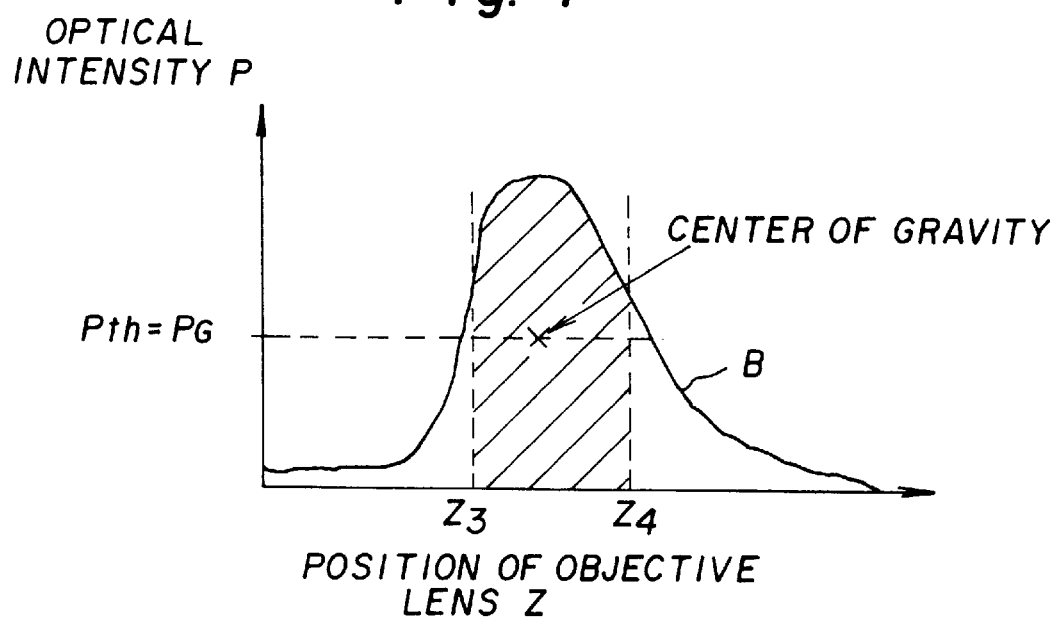
FIG. 8 is a view for explaining a way of determining an optical-intensity threshold.

One way to define the threshold $P_{th}$ is, as shown in FIG. 8, to represent the threshold to be α% (but, 0≦α<100) of the maximum value $P_{max}$ of the optical-intensity curve B. That is, the threshold is defined according to $P_{th}=\alpha \times P_{max}/100$. Another way to define the threshold $P_{th}$ is to perform sample measurements to predetermine positions $z_3$ and $z_4$ (positions of the objective lens 15 corresponding to an approximate graph region where the measurement object 16 exists), to define a center of gravity $P_G$ in the optical-intensity axis direction of an area below the optical-intensity curve between z3 and z4, and to represent it as a threshold $P_{th}=P_G$.

Figure 7:
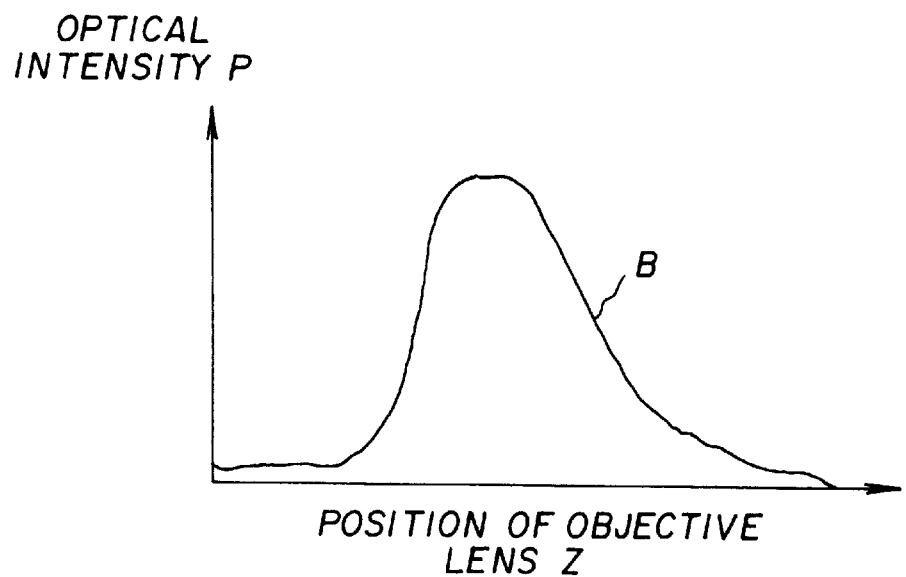
FIG. 7 is a graph showing an optical-intensity curve representing a measurement result of a surface of a measurement object.

Suppose an optical-intensity curve B, as shown in FIG. 7, be represented by f(z) as a function of a position z of the objective lens 15. In this case, when a threshold $P_{th}$ is defined in one of the ways described above, the data processor 24 will define a center-of-gravity position $Z_G$ in the shift direction of the objective lens 15 according to the optical-intensity curve f(z) according to expression (1) below.

$$Z_G = \frac{\int_{z_1}^{z_2} z \cdot \{f(z) - P_{th}\} dz}{\int_{z_1}^{z_2} \{f(z) - P_{th}\} dz} \quad (1)$$

Figure 9:
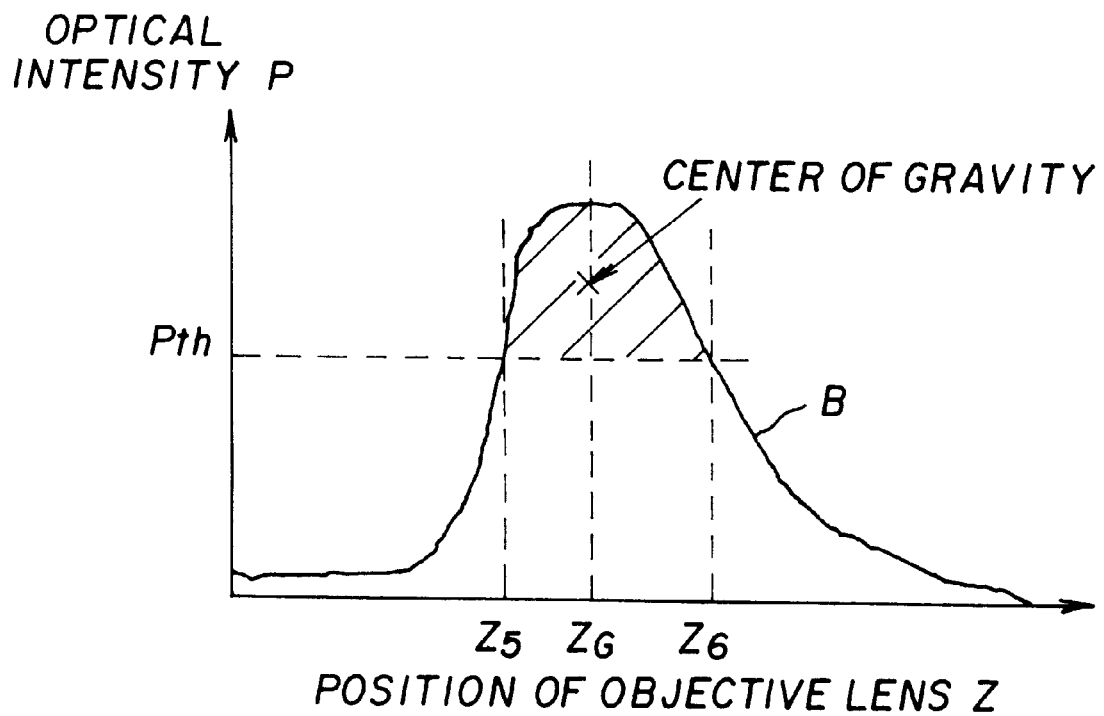
FIG. 9 is a view for explaining a method for detecting the position of a surface of a measurement object.

In the expression (1), $z_1$ and $z_2$ individually represent a position of the objective lens 15 when an optical intensity P is the same as the threshold $P_{th}$. As shown in FIG. 9, the data processor 24 defines a center-of-gravity position $Z_G$, and determines the focal point when the objective lens 15 is positioned at the center-of-gravity position $Z_G$ to be the position of a surface of the measurement object 16.

When the composite optical-intensity curve f(z) is represented by data $f(z_i)$ at discrete position $z_i$ of the objective lens 15, the center-of-gravity position $Z_G$ of the objective lens 15 in the shift direction is expressed by expression (2) below.

$$Z_G = \frac{\sum_{z_i=z_1}^{z_2} z_i \{f(z_i) - P_{th}\}}{\sum_{z_i=z_1}^{z_2} \{f(z_i) - P_{th}\}} \quad (2)$$

In this way, the displacement measuring apparatus 11 can measure the measurement object with respect to surface displacement displacements, displacement from a reference position, and the distance from the measuring apparatus. Alternatively, when two macro points (i.e., two points spaced by a longer distance than shift pitch δ) are measured, displacements and vertical displacements thereof can be measured. For example, measurement can be performed for displacements and thickness in the vertical direction of ceramic substrates and electrodes printed thereon.

Figure 10:
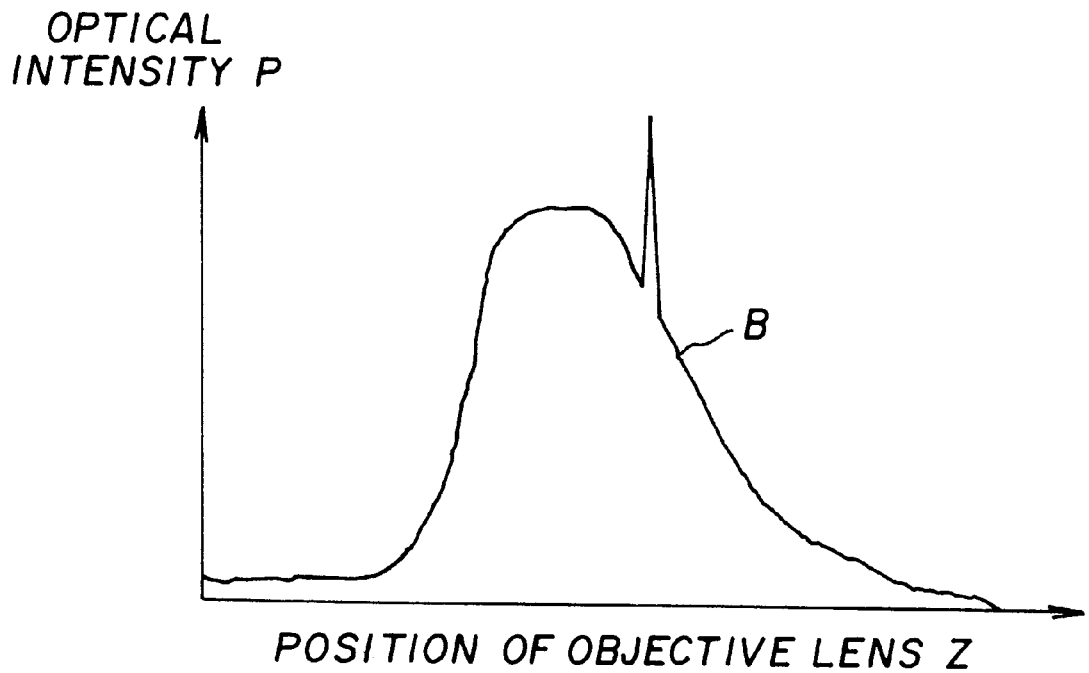
FIG. 10 is a view for explaining a condition wherein an Act optical-intensity curve has a noise spike.

The displacement measuring apparatus 11 of the present invention using a confocal optical system can detects the position of a surface of the measurement object 16 according to the center-of-gravity position of the optical-intensity curve. Therefore, even at which the optical intensity is measured in an unstable condition, and unusually large values are detected because of noise and the like (that is, even when, a spike occurs, as shown in FIG. 10), the measurement is not affected, and therefore, relatively stable measurement results can be produced. As in the conventional case, however, with a method to detect the surface position of the measurement object 16 according to the maximum value of an optical-intensity curve, an optical intensity represented by a spike protruding from the curve is detected, an erroneous measurement result is immediately outputted, and the measurement results are apt to be inconsistent.

With this embodiment, operation of positions and displacements of the measurement object 16 is carried out according to the center-of-gravity position of the optical-intensity curve B. This allows positions and displacements of the measurement object 16 to be detected with a precision range smaller than the sampling interval in the shift direction of the objective lens 15. Also, this embodiment defines the center-of-gravity position according to the optical intensity P which is greater than the optical intensity threshold $P_{th}$ to eliminate undue noise components, allowing measurement precision to be higher.

(Second Embodiment)

Figure 11:
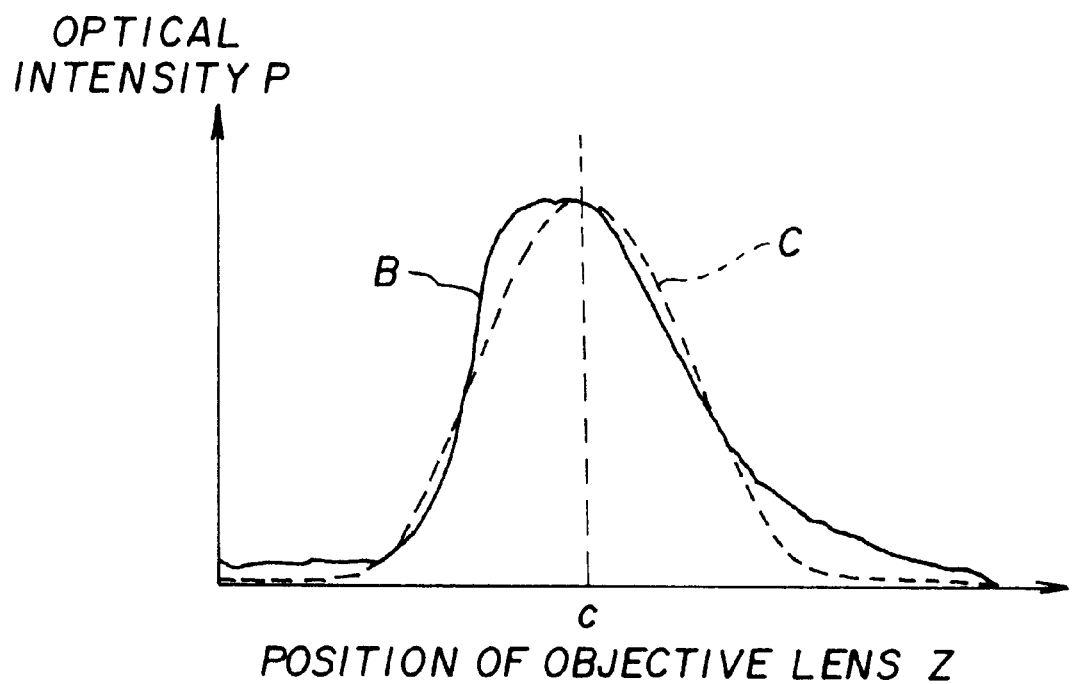
FIG. 11 is a view for explaining a method for detecting the position of a surface of a measurement object in another embodiment of the present invention.

Hereinbelow, a second embodiment is described. In this embodiment, as shown in FIG. 11, an optical-intensity curve B is approximated, and the position of a surface of a measurement object 16 is detected according to a reference position of an approximate curve C thereof.

For example, the approximate curve C is assumed to be expressed by expression (3) below, in which a, b, and c individually represent constants.

$$K(z)=a \cdot \exp\{-b(z-c)^2\} \quad (3)$$

The data processor 24 determines values of the constants a, b, and c by a least-square operation or the like. It then assumes a center z=c of the approximate curve C to be a reference position and determines the focal point of the objective lens 15, when the objective lens 15 is positioned at the reference position, as the position of a surface of the measurement object 16. Alternatively, the embodiment may have an arrangement that assumes a position deviating from the center z=c of the approximate curve C by a predetermined distance to be a reference position and determines the focal point, when the objective lens 15 is positioned at the reference position, as the position of a surface of the measurement object 16. Referring back to the functions for the approximate curve, as described above, different functions may of course be used.

Figure 12:
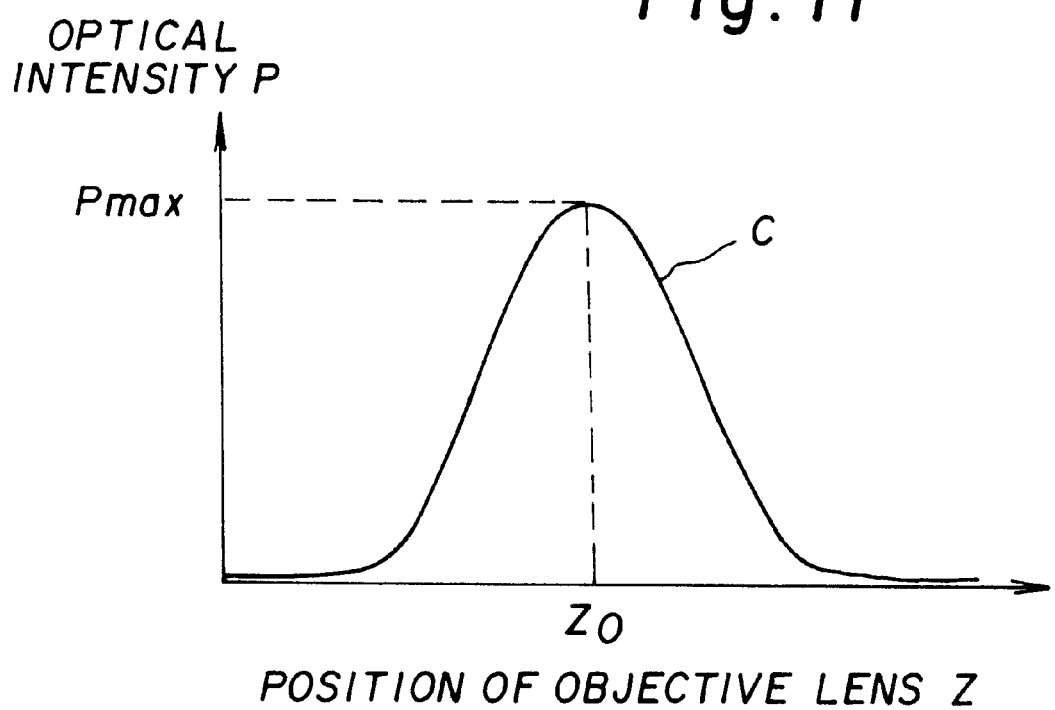
FIG. 12 is a view for explaining a method for detecting method for the position of a surface of a measurement object in yet another embodiment of the present invention.

The embodiment may have an arrangement in which, after the approximate curve has been defined, as shown in FIG. 12, a surface of the measurement object 16 may be determined to be positioned at the focal point when the objective lens 15 is positioned at a position $z_{max}$ where the approximate curve has a maximum value $P_{max}$. Alternatively, the embodiment may have an arrangement in which, after an approximated value has been defined, a center-of-gravity position of the approximate curve may be defined, similarly to the case of the first embodiment, and the surface of the measurement object 16 may be determined to be positioned at the focal point when the objective lens 15 is positioned at the center-of-gravity position thereof.

As described above, the ways to use an approximate curve are characterized in that a focal point of a substantially ideal curve can be determined.

(Third Embodiment)

Figure 13:
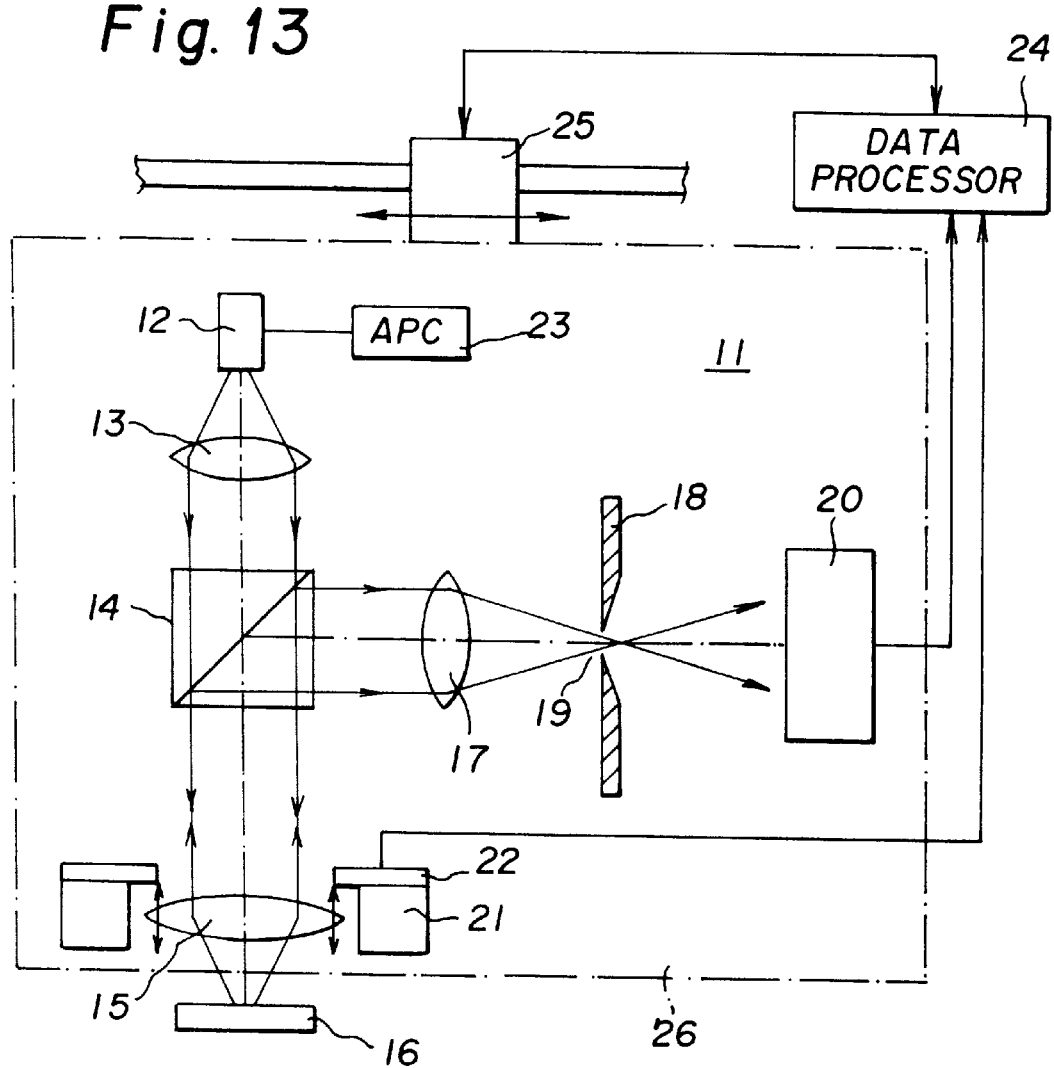
FIG. 13 is a schematic view showing a configuration of another embodiment of a displacement measuring apparatus according to the present invention.

FIG. 13 provides a view showing a configuration of a third embodiment of displacement measuring apparatus 11. A Alight source 12 is comprised of elements such as a laser diode and laser-driving circuit, and it outputs optical beams (laser beams) controlled by an automatic power controller (APC) 23 so as to have a predetermined optical intensity. The light source 12 is arranged so that its illuminant point is aligned with the focal point of a collimating lens 13, and diverging optical beams emitting from the light source 12 are converted to parallel optical beams. After passing through the collimating lens 13 and having been converted to the parallel optical beams, the optical beams are then incident on a beam-splitter cube 14, and a part of the optical beams is passed through the beam-splitter cube 14 so as to be incident on an objective lens 15.

The objective lens 15 has a lens driver 21. The objective lens 15 is driven by the lens driver 21 at a predetermined amplitude and a predetermined frequency. Drivers that can be employed for the lens driver 21 include a type in which a magnetic force is exerted on a magnetic material provided in the objective lens 15 by using an alternating magnetic field occurring in a voice coil so as to vibrate the objective lens 15 in the optical-axis direction at an amplitude of 100 μm and a frequency of 1 kHz. Near the objective lens 15 is provided position sensor 22 that can detect the position of the objective lens 15 with high precision.

After passing through the objective lens 15, the optical beams are converged through the objective lens 15 and are then incident on a measurement object 16 placed so as to oppose the objective lens 15. The optical beams reflected off the measurement object 16 are passed through the objective lens 15 again, and a part of the optical beams is reflected by the beam-splitter cube 14. The optical beams reflected by the beam-splitter cube 14 are reflected by 90 degrees and are incident on a converging lens 17. A light shield 18 having a pinhole 19 is provided at the focal point of the converging lens 17, and the optical beams, after passing through the converging lens 17, are then converged through the pinhole 19. The optical beams passing through the pinhole 19 and are received by an optical detector 20 made of elements such as a photodiode, a phototransistor, a CCD (charge-coupled device), and so on.

A data processor 24 receives information on the position of objective lens 15, which has been detected by the position sensor 22, and a value P representing the optical intensity which has been measured by the optical detector 20. In this way, the data processor 24 retrieves the position-related information and the value P of the optical intensity from the position sensor 22 and the optical detector 20 and performs predetermined processing so as to measure, for example, a curve representing the optical intensity, as shown in FIG. 2.

Figure 14:
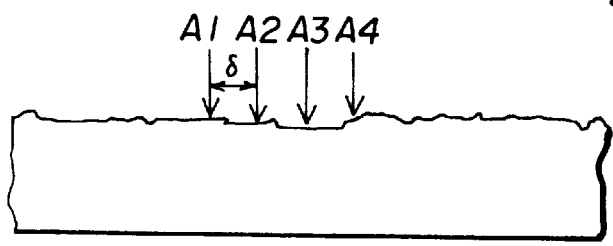
FIG. 14 is an enlarged view of a surface of a measurement object.

Also, the displacement measuring apparatus 11 has a measuring head 26 (which contains the optical system of the displacement measuring apparatus 11) that can be shifted by a head driver 25 in the direction parallel to the surface of measurement object 16. According to this, the displacement measuring apparatus 11 defines an optical-intensity curve when the objective lens 15 is shifted for different positions of the measurement object, which has fine irregularities as shown in FIG. 14, and stores it. A shift pitch δ of the measuring head 26 at this time is determined depending on the surface condition of the measurement object 16, and it may preferably be the same as or several times the size of irregularities of the surface.

Also, when the spot diameter of an optical beam incident on the measurement object 16 is too large, all the optical-intensity curves are the same. Therefore, the minimum spot diameter must be appropriate. This spot diameter may be determined on a trial basis according to the measurement object 16, but it may preferably be several times the size of a plane portion of the measurement object 16, particularly, two times the size.

Figure 15:
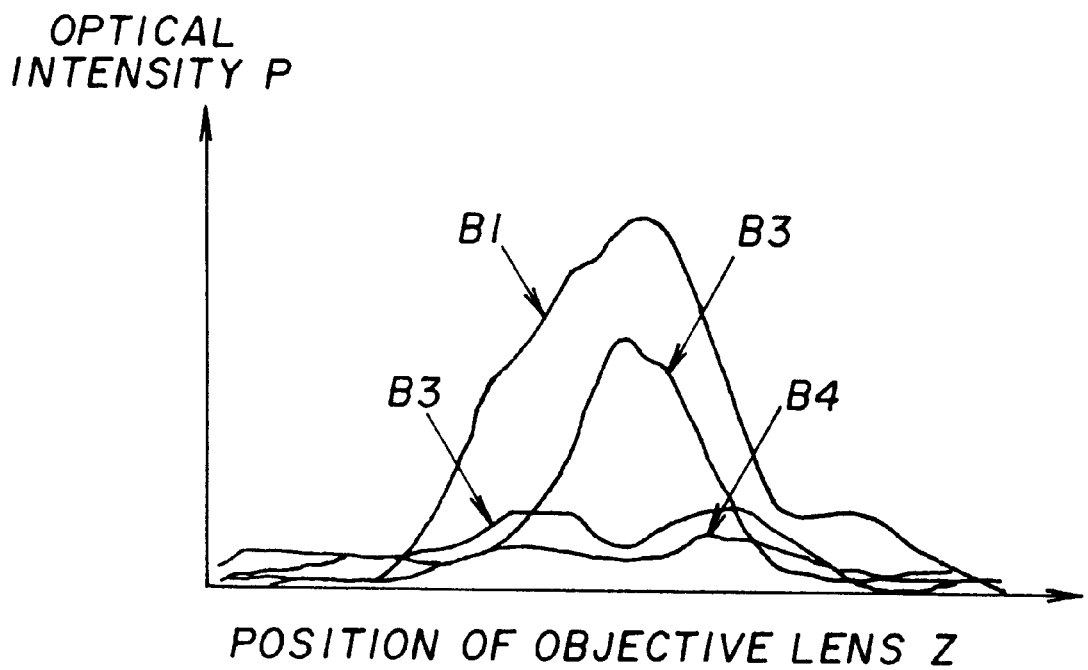
FIG. 15 is a graph showing optical-intensity curves representing measurement results at different positions of a measurement object.
Figure 16:
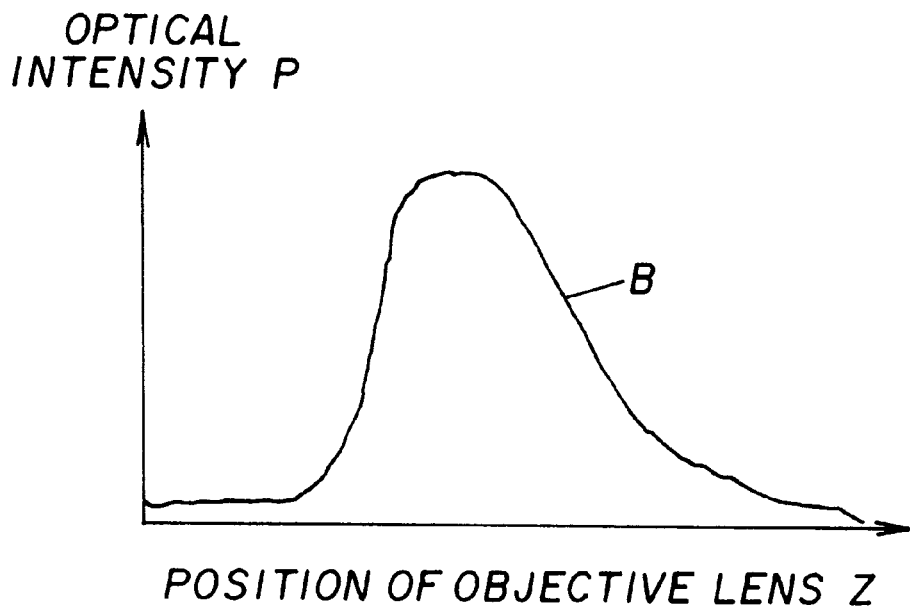
FIG. 16 is a graph showing a composite optical-intensity curve representing a combination of the optical-intensity curves in FIG. 15.
Figure 17:
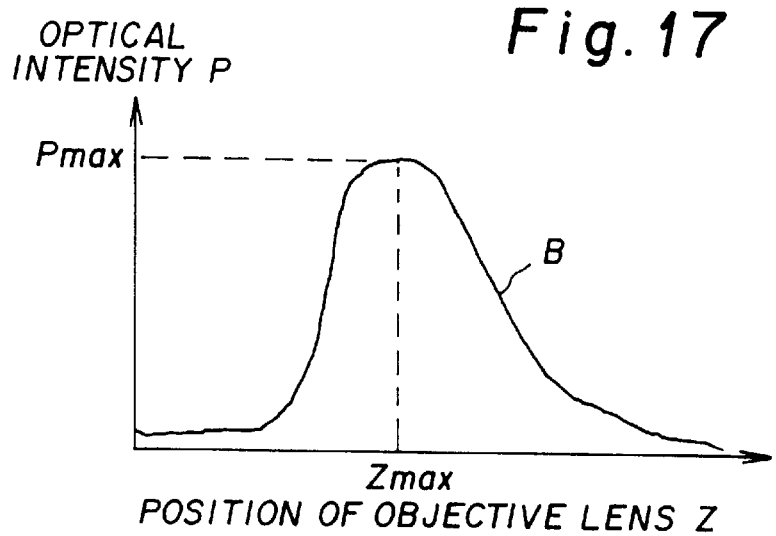
FIG. 17 is a view for explaining a method for detecting the position of a surface of a measurement object in the aforementioned embodiment.

For example, suppose individual optical-intensity curves representing measurement results of individual points A1 to A4 in FIG. 14 are optical-intensity curves B1 to B4 in FIG. 15. In this case, the data processor 24 combines these optical-intensity curves B1 to B4 and defines an optical-intensity curve B as shown in FIG. 16. Consecutively, as shown in FIG. 17, according to the composite optical-intensity curve B, the data processor 24 defines a position $z_{max}$ where the optical intensity is the maximum value $P_{max}$ and determines the focal point of the objective lens 15 thereat to be the position of a surface of the measurement object 16.

Figure 18:
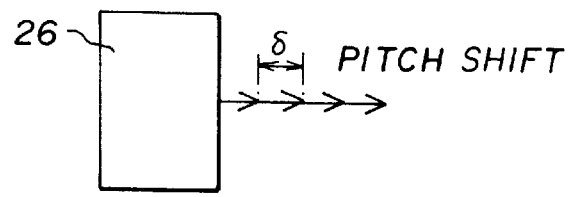
FIG. 18 is a view for explaining a way of shifting manner of a measuring head.
Figure 18:
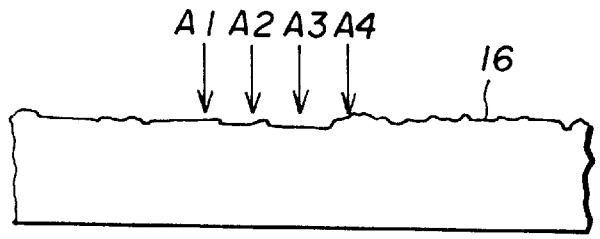
Figure 19:
FIG. 19 is a view for explaining another shifting manner of the measuring head.
Figure 19:
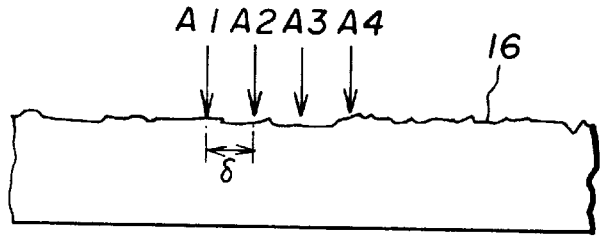

The head driver 25 may be arranged, as shown in FIG. 18, to shift the measuring head 26 intermittently at a predetermined pitch 6 so that the individual optical intensity curves are measured by the measuring head 26 that stops at positions corresponding to the individual points A1 to A4. Alternatively, as shown in FIG. 19, the head driver 25 may be arranged to shift the measuring head 26 continuously at a predetermined speed so that the individual optical-intensity curves are measured at every pitch of δ for the individual points A1 to A4.

In the latter case, the speed of the measuring head 26 shifted by the head driver 25 must be lower than the shift speed of the objective lens 15. The former case, in which the measuring head 26 is shifted per pitch, as shown in FIG. 18, may be a drive method better suiting the purpose of the head driver 25 since the same position should be statically measured for an optical-intensity curve. However, this requires high-speed shifting and stopping to be repeated, making it difficult to carry out pitch-based shifting, and possibly causing unstable operation. In contrast, in the latter case, in which the measuring head 26 is shifted at a predetermined speed, the measuring head 26 shifts continuously even during the measurement of an optical-intensity curve. In this case, some errors may be taken into consideration. However, the measuring head 26 shifts continuously at a predetermined speed, allowing high-speed measurement to be achieved, and in addition, allowing stabilized operation.

As described above, the displacement measuring apparatus 11 can measure the measurement object with respect to the surface displacement, displacement from a reference position, and distance from the apparatus. Alternatively, when two macro points (i.e., two points spaced apart by a longer distance than the shift pitch δ are measured, the displacement and the vertical displacements thereof can be measured. For example, measurement can be performed for displacements and thickness in the height direction of ceramic substrates and electrodes printed thereon.

Also, according to the displacement measuring apparatus 11 of the present invention using a confocal optical system and a measurement principle thereof, distributed optical-intensities at positions where the surface has fine irregularities are combined so as to reduce diverging effects due to irregularities of the surface, allowing stable measurement of the displacement and distance of the measurement object 16.

That is, when the surface of the measurement object 16 is close to a specular reflector, the optical intensity of reflected light is relatively higher, and a measurement error range also is smaller. However, when diverging effects due to irregularities of the surface of the measurement object 16 are great, the optical intensity of reflected light is relatively lower. Therefore, even to define an average value for curved surfaces, the error range is larger.

The principle of the present invention makes use of the characteristics described above. In a simple way, to detect the surface position of the measurement object 16 by averaging focal points of the objective lens 15, they are averaged at the same relative magnitude in the case of a large error range and in the case of a small error range. In contrast, in a way to combine optical-intensity curves, the relative magnitude in the case of large error range is greater, and the relative magnitude in the case of small error range is smaller. As a result, even when irregularities of the surface of the measurement object 16 are large, positions and displacements can be measured stably and with high precision.

In addition, when displacements and positions of the measurement object 16 are to be detected according to a position $z_0$ corresponding to the maximum value $P_{max}$ of the composite optical-intensity curve, the number of operations can be smaller, compared to cases of other embodiments of the present invention.

(Fourth Embodiment)

Hereinbelow, a fourth embodiment is described. In the third embodiment, the surface position is detected according to the maximum value $P_{max}$ of the composite optical-intensity curve B. In this embodiment, however, the position of a surface of the measurement object 16 is detected according to the center-of-gravity position of the composite optical-intensity curve B. In this embodiment, stages up to the combination of optical-intensity curves in the configuration of the displacement measuring apparatus 11 (FIG. 13) and the data processor 24 are the same as in the case of the third embodiment. Therefore, a description on the same stages is omitted.

With an assumption that a composite optical-intensity curve B, as shown in FIG. 16, is represented by a function f(z) of a position z of the objective lens 15, the data processor 24 is to define a center-of-gravity position $Z_G$ in the shift direction of the objective lens 15 according to the optical-intensity curve f(z) according to expression (4) below.

$$Z_G = \frac{\int_{z_1}^{z_2} z \cdot f(z) dz}{\int_{z_1}^{z_2} f(z) dz} \quad (4)$$

In the expression (4), $z_1$ and $z_2$ individually represent a position of the objective lens 15 positioned at two ends of a shift (vibration) range. The data processor 24 defines a center-of-gravity position $Z_G$, as shown in FIG. 20, and determines the focal point when the objective lens 15 is positioned at the center-of-gravity position $Z_G$ to be the position of a surface of the measurement object 16.

When the composite optical-intensity curve f(z) is represented by data $f(z_i)$ at discrete positions $z_i$ of the objective lens 15, the center-of-gravity position $Z_G$ of the objective lens 15 is expressed by expression (5) below.

$$Z_G = \frac{\sum_{z_i=z_1}^{z_2} z_i \cdot f(z_i)}{\sum_{z_i=z_1}^{z_2} f(z_i)} \qquad (5)$$

$$Z_G = \frac{\sum_{z_i=z_5}^{z_6} z_i \{f(z_i) - P_{th}\}}{\sum_{z_i=z_5}^{z_6} \{f(z_i) - P_{th}\}} \qquad (7)$$

With the third embodiment, measurement cannot be carried out with a precision range smaller than the sampling interval in the shift direction of the objective lens 15. However, by operation of positions and displacements of the measurement object 16 according to the center-of-gravity position of the composite optical-intensity curve B, as in the case of this embodiment, positions and displacements of the measurement object 16 can be detected with a precision range smaller than the sampling interval in the shift direction of the objective lens 15.

(Fifth Embodiment)

Hereinbelow, a fifth embodiment of the present invention is described. The fourth embodiment defines the center-of-gravity position of the combination of the composite optical-intensity curves. The fifth embodiment, however, defines a threshold, a center-of-gravity position in a graph region of the optical intensity which is higher than the threshold, and detects the position of a surface of the measurement object 16 according to the center-of-gravity position.

After having defined a composite optical-intensity curve B by combining optical-intensity curves, the data processor 24 performs operation to define a threshold $P_{th}$ according to the optical-intensity curve B. One way to define the threshold $P_{th}$ is to represent the threshold to be $\alpha\%$ (but, $0<\alpha<100$) of the maximum value $P_{max}$ of the composite optical-intensity curve B. That is, the threshold is defined according to $P_{th}=\alpha \times P_{max}/100$. Another way to define the threshold $P_{th}$ is, as shown in FIG. 21, to perform sample measurements to predetermine positions $z_3$ and $z_4$ (positions of the objective lens 15, which corresponds to an approximate graph region where the measurement object 16 exists), to define the center of gravity $P_G$ in the optical-intensity axis direction of an area below the optical-intensity curve between $z_3$ and $z_4$, and to represent it as a threshold $P_{th}=P_G$.

Having defined a threshold $P_{th}$ in one of the ways described above, the data processor 24 is to define a center-of-gravity position $Z_G$ in the shift direction of the objective lens 15 according to the optical-intensity curve f(z) by using expression (6) below.

$$Z_G = \frac{\int_{z_5}^{z_6} z \cdot \{f(z) - P_{th}\} dz}{\int_{z_5}^{z_6} \{f(z) - P_{th}\} dz} \qquad (6)$$

Figure 22:
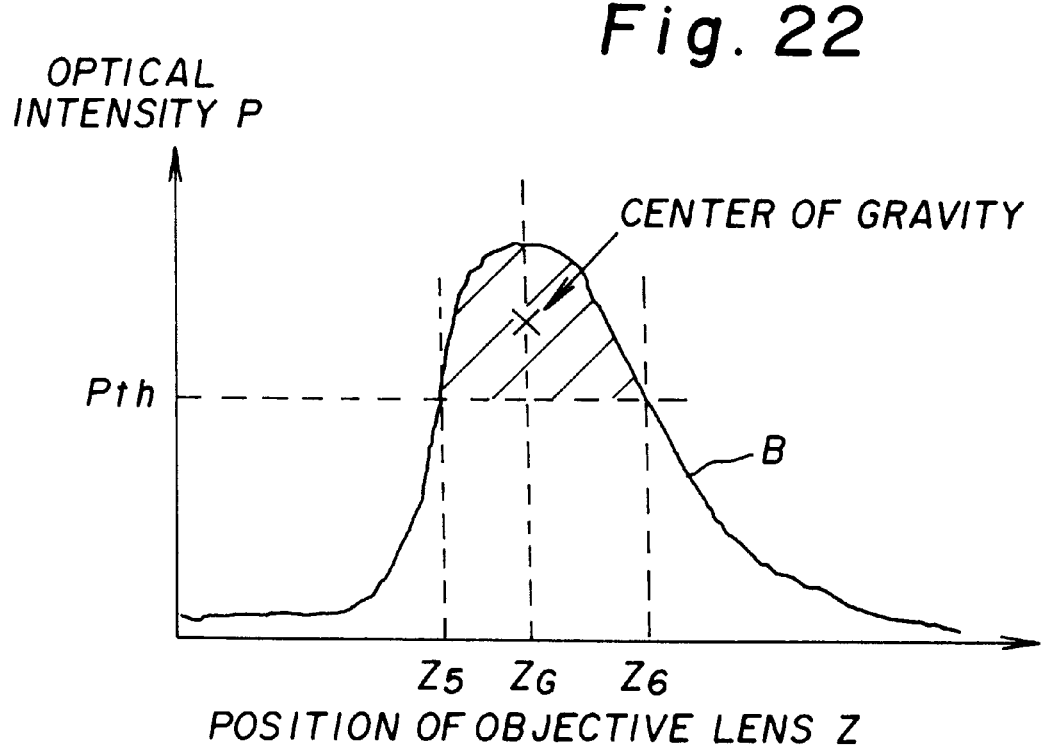
FIG. 22 is a view for explaining a method for detecting the position of a surface of a measurement object in the aforementioned embodiment of the present invention.

In the expression (6), $z_5$ and $z_6$ individually represent positions of the objective lens 15 at which the optical intensity P is the same as the threshold $P_{th}$. The data processor 24 defines a center-of-gravity position $Z_G$ and, as shown in FIG. 22, determines the focal point when the objective lens 15 is positioned at the center-of-gravity position $Z_G$ to be the position of a surface of the measurement object 16.

When the composite optical-intensity curve f(z) is represented by data $f(z_i)$ at discrete position $z_i$ of the objective lens 15, the center-of-gravity position $Z_G$ of the objective lens 15 in the shift direction is expressed by expression (7) below.

With this embodiment also, by operation of positions and displacements of the measurement object 16 from the center-of-gravity position of the composite optical-intensity curve B, positions and displacements of the measurement object 16 can be measured with a precision range smaller than the sampling interval in the shift direction of the objective lens 15. In addition, since the center-of-gravity position is defined according to the optical intensity P which is equal to or higher than the optical-intensity threshold $P_{th}$, the measurement precision can be further improved.

(Sixth Embodiment)

Figure 23:
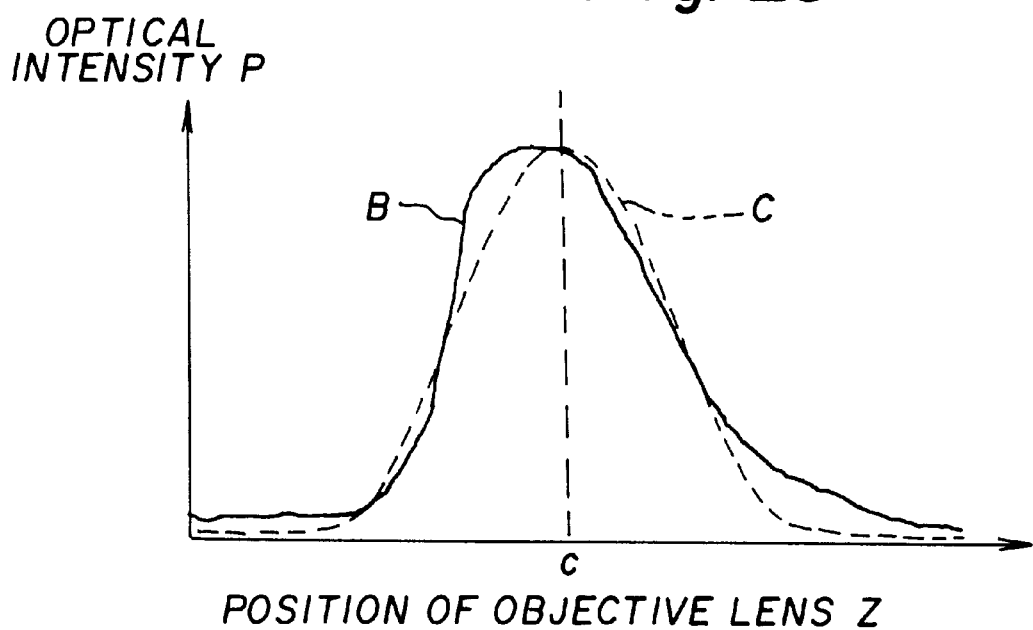
FIG. 23 is a view for explaining a method for detecting the position of a surface of a measurement object in still another embodiment of the present invention.

Hereinbelow, a sixth embodiment is described. In this embodiment, as shown in FIG. 23, an optical-intensity curve B is approximated, and the position of a surface of a measurement object 16 is detected according to a reference position of an approximate curve C thereof.

The approximate curve C is now assumed to be expressed by expression (8) below, for example, in which a, b, and c individually represent constants.

$$K(z)=a \cdot \exp\{-b(z-c)^2\} \qquad (8)$$

The data processor 24 determines values for the constants a, b, and c by a least-square operation or the like. It then assumes a center z=c of the approximate curve C to be a reference position and determines the focal point of the objective lens 15, when the objective lens 15 is positioned at the reference position, to be the position of a surface of the measurement object 16. Alternatively, a position deviating from the center z=c of the approximate curve C by a predetermined distance may be assumed to be the reference position, and the focal point, when the objective lens 15 is positioned at the reference position, may be determined as the position of a surface of the measurement object 16.

For the approximate curve, different functions from those described above may of course be used. In this case, depending on the approximated function, the reference position may be a position or a center-of-gravity position where the optical intensity is the maximum.

These ways of using an approximate curve are characterized in that a focal point of a substantially ideal curve can be determined.

Figure 24:
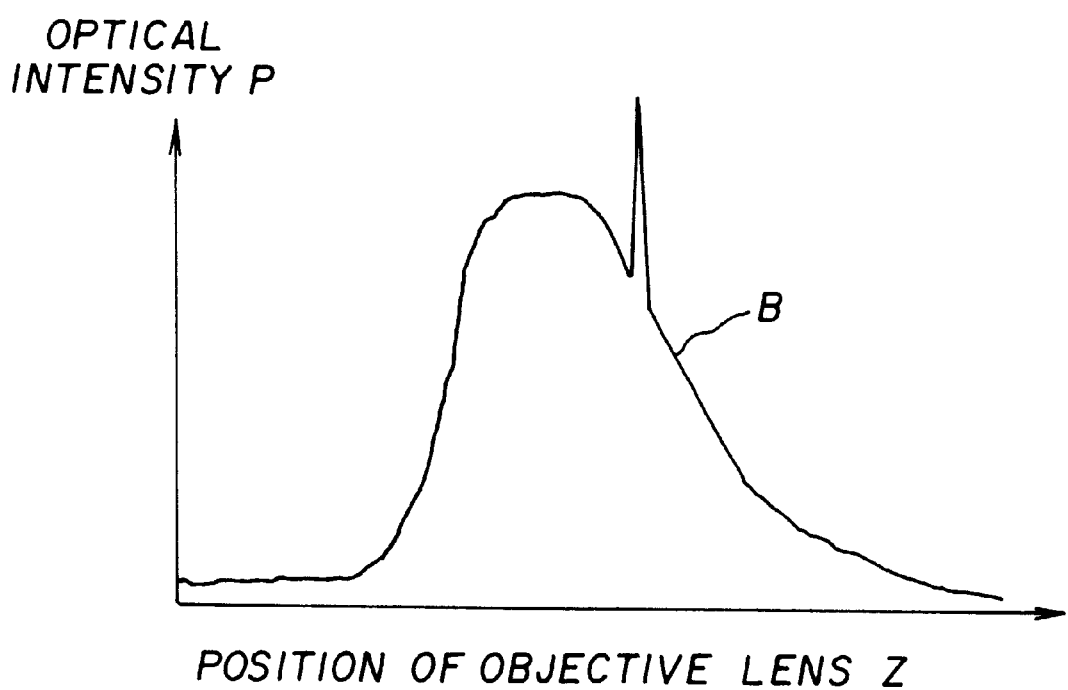
FIG. 24 is a view for explaining condition wherein an optical-intensity curve has a noise spike.

Also, in the fourth or fifth embodiments, the position of a surface of the measurement object 16 is detected according to the center-of-gravity position of the optical-intensity curve. Alternatively, in the sixth embodiment, the position of a surface of the measurement object 16 is detected according to an approximate curve. Therefore, even at which the optical intensity is measured in an unstable condition and unusually large values are detected because of noise and the like (that is, even when, a spike occurs, as shown in FIG. 24), measurement is not affected thereby, and relatively stable measurement results can be produced. However, as in the conventional case, in a method to detect the surface position of the measurement object 16 according to the maximum value of the optical-intensity curve, when an optical intensity represented by a spike protruding from the curve is detected, an erroneous measurement result is immediately outputted, and the measurement results are apt to be inconsistent.

What is claimed is:

1. A displacement measuring method comprising the steps of projecting optical beams to a measurement object through an objective lens, receiving optical beams reflected off the measurement object, and shifting the focal point of the objective lens in an optical-axis direction, thereby measuring variations in optical intensity which are attributable to shifting of the focal point; and defining a threshold according to a curve representing the variations in the optical intensity and defining the center of gravity in a graph region surrounded by the curve and the threshold, thereby measuring displacements of the measurement object according to the center-of-gravity position.

2. A displacement measuring method as claimed in claim 1, wherein said threshold intersects said curve at two points, neither of said two points corresponding to said focal point.

3. A displacement measuring method comprising the steps of projecting optical beams to a measurement object through an objective lens, receiving optical beams reflected off the measurement object, and shifting the focal point of the objective lens in an optical-axis direction, thereby measuring variations in optical intensity which are attributable to shifting of the focal point; and defining a predetermined curve approximated from a curve representing the variations in the optical intensity and measuring displacements of the measurement object according to the approximate curve.

4. A displacement measuring method as claimed in claim 3, wherein said predetermined curve is centered in accordance with said curve representing the variations in the optical intensity.

5. A displacement measuring method comprising the steps of projecting optical beams to a measurement object through an objective lens, receiving optical beams reflected off the measurement object, and shifting the focal point of the objective lens in an optical-axis direction, thereby measuring variations in an optical intensity which are attributable to shifting of the focal point; and combining variations in individual optical intensities measured at a plurality of measurement positions to produce a combination result and measuring displacements of the measurement object according to the combination result.

6. A displacement measuring method as claimed in claim 5, wherein measuring displacements of the measurement object are measured according to a position where variations of the combined optical intensities reach a maximum.

7. A displacement measuring method as claimed in claim 5, wherein a threshold is defined according to a curve representing the variations of the combined optical intensities, a center-of-gravity position of a graph region surrounded by the curve and the threshold is defined, and variations are measured according to the center-of-gravity position.

8. A displacement measuring method as claimed in claim 5, wherein a predetermined curve approximated from a curve representing variations in the combined optical intensities is defined and displacements of the measurement object are measured according to the approximate curve.

9. A displacement measuring method as claimed in claim 5, wherein a measurement position among said plurality of measurement positions is spaced a predetermined distance from an adjacent measurement position among said plurality of measurement positions in a direction lateral to said optical-axis direction.

10. A displacement measuring apparatus comprising:

a light emitter for emitting optical beams, an objective lens for projecting optical beams emitted from the light emitter to a measurement object, lens-driving means for shifting the objective lens in an optical-axis direction, lens-position-detecting means for detecting positions of the objective lens, an optical receiver for receiving optical beams reflected off the measurement object, shifting means for shifting the position at which optical beams are projected on a surface of the measurement object, and measuring means for combining variations in optical intensities which are measured by the optical receiver at a plurality of measurement positions of the measurement object while the objective lens is moved to produce a combination result and for measuring displacements of the measurement object according to the combination result.

11. A displacement measuring apparatus comprising:

a light emitter for emitting optical beams, an objective lens for projecting optical beams emitted from the light emitter to a measurement object, lens-driving means for shifting the objective lens in an optical-axis direction, an optical receiver for receiving optical beams reflected off the measurement object, and for measuring variations in optical intensity which are attributable to the shifting of the objective lens, measuring means for defining a threshold according to a curve representing the variations in the optical intensity and defining the center of gravity in a graph region surrounded by the curve and the threshold, thereby measuring displacements of the measurement object according to the center-of-gravity position.

12. A displacement measuring apparatus comprising:

a light emitter for emitting optical beams, an objective lens for projecting optical beams emitted from the light emitter to a measurement object, lens-driving means for shifting the objective lens in an optical-axis direction, an optical receiver for receiving optical beams reflected off the measurement object, and for measuring variations in optical intensity which are attributable to the shifting of the objective lens, measuring means for defining a predetermined curve approximated from a curve representing the variations in the optical intensity and measuring displacements of the measurement object according to the approximate curve.

* * * * *